United States Patent Office 2,942,058
Patented June 21, 1960

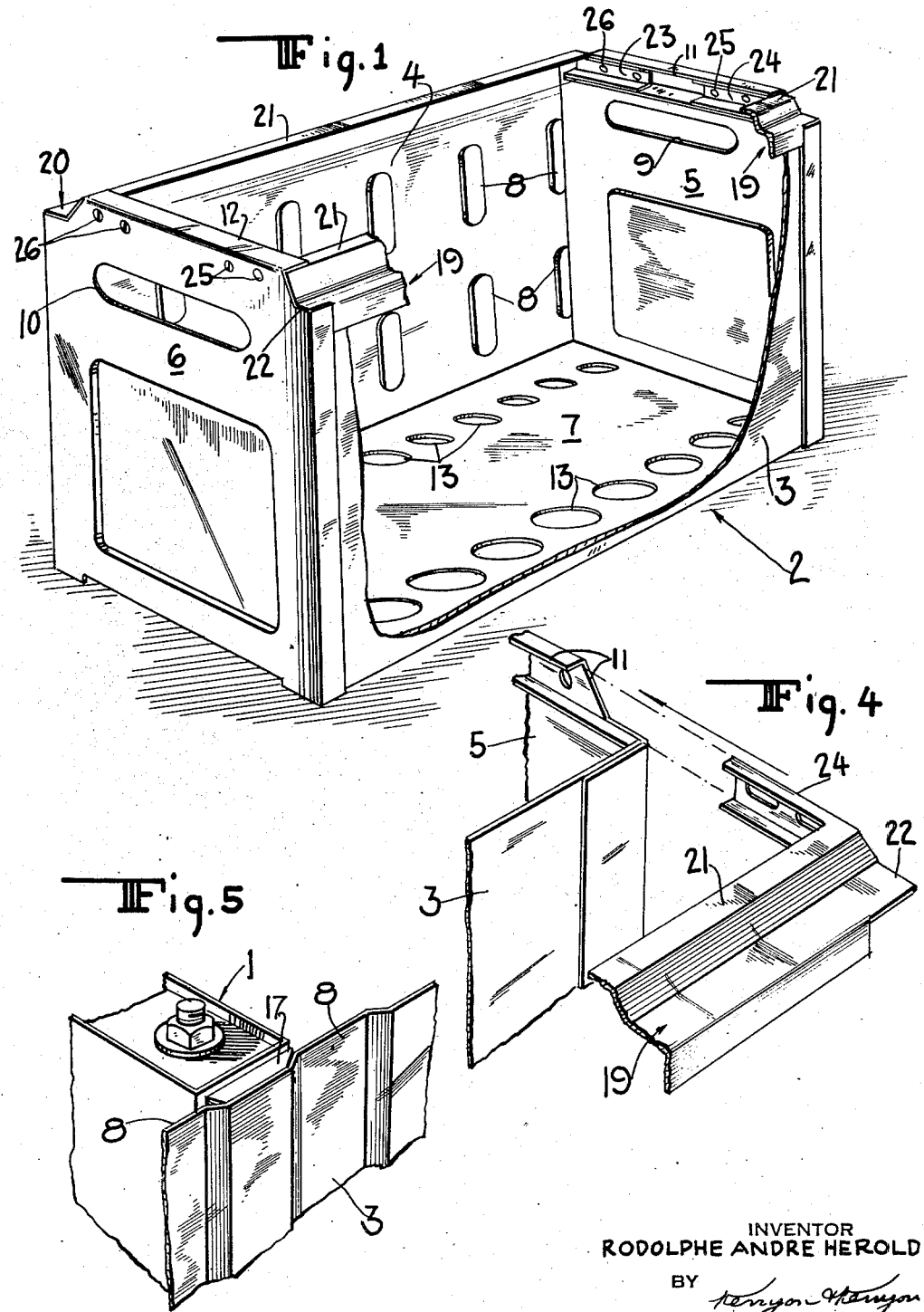

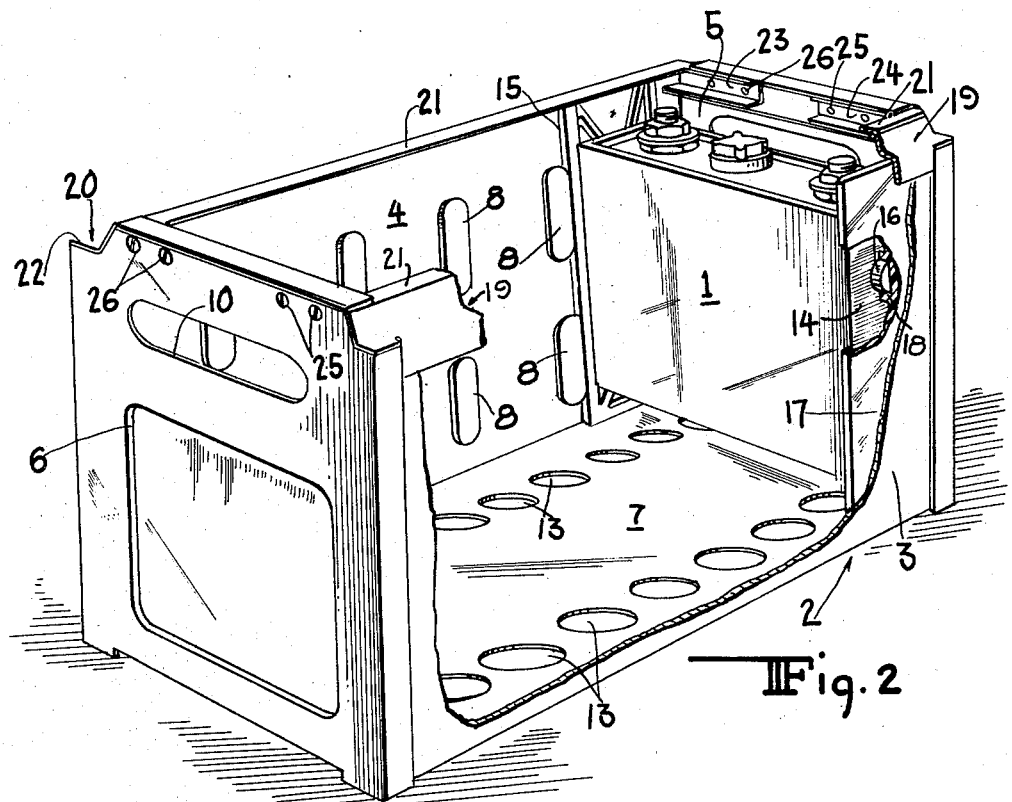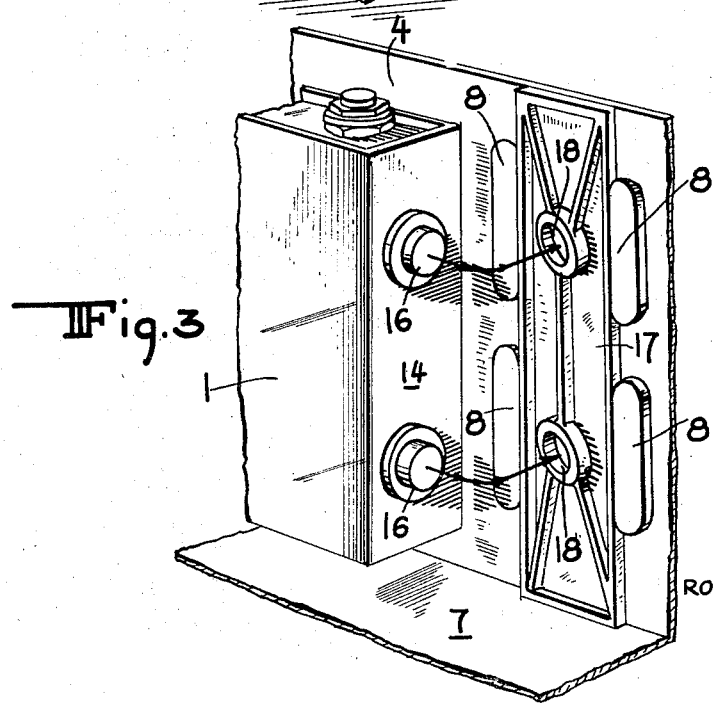

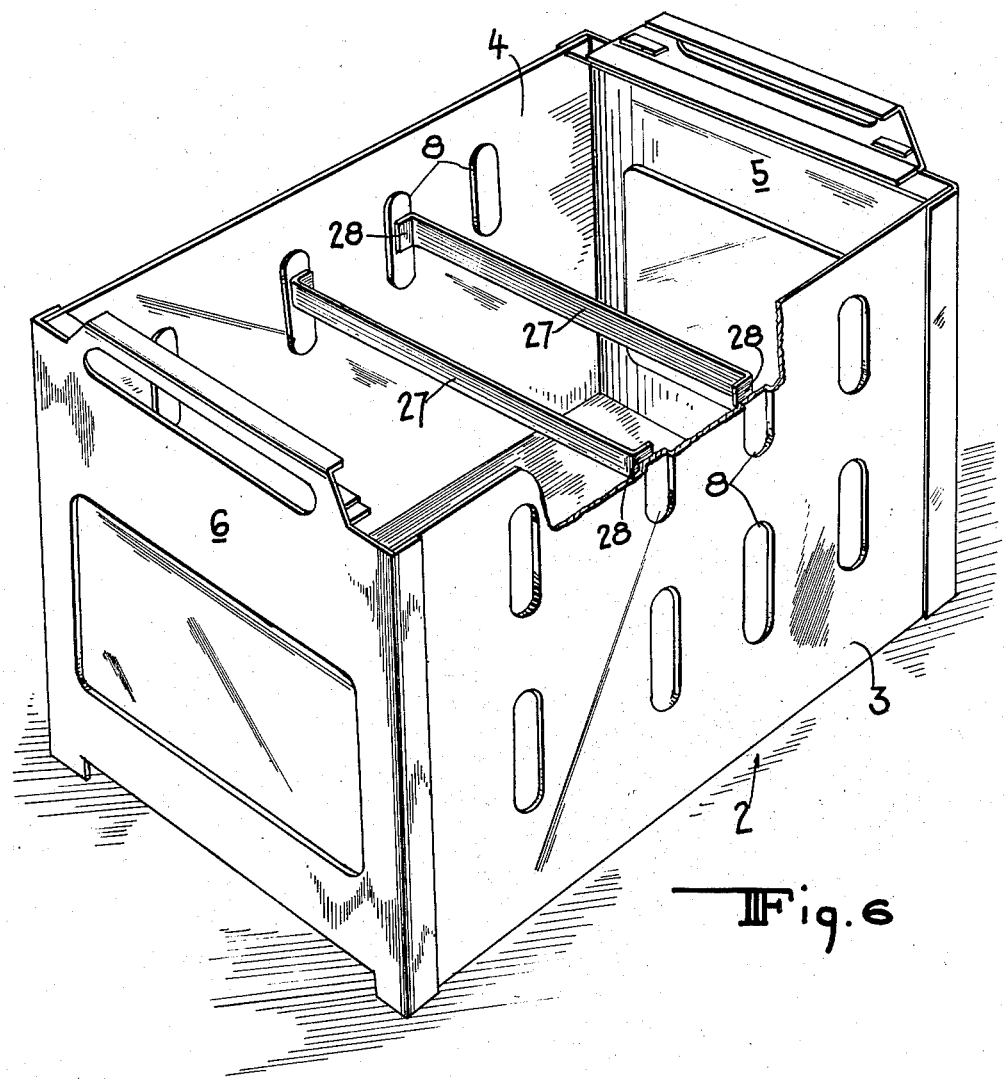

2,942,058

STORAGE BATTERY

Rodolphe André Herold, Boulogne-Billancourt, France, assignor to Societe des Accumulateurs Fixes et de Traction (Societe Anonyme), Romainville, France, a French company Filed May 20, 1958, Ser. No. 736,486

Claims priority, application France May 25, 1957

4 Claims. (Cl. 136—166)

The present invention relates to storage batteries of the type in which a plurality of storage cells utilizing an alkaline electrolyte are mounted in spaced relationship in a container.

In storage batteries presently used the individual storage cells of the battery are mounted in steel containers which are usually nickel-plated and coated with a layer of paint, for example, in order to protect the container against corrosion. When a plurality of storage cells are assembled to form a complete storage battery care must be exercised to insulate each storage cell from the others to eliminate dielectric currents which may arise in a humid atmosphere, or from an overflow of electrolyte during filling. Storage batteries presently in use accordingly consist either of an impregnated wooden frame in which the individual storage cells are suspended at spaced intervals by means of insulated knobs or lugs, or else the individual storage cells are covered with insulating material, such for example as a layer of ebonite or synthetic rubber, and then a group of storage cells are placed in a case and wedged to secure them in position.

The insulation resulting from mounting a plurality of storage cells in a frame is greater than with other known methods of assembling storage batteries since the provision of an insulating sheet or layer of air between the various storage cells insures a better dissipation of moisture, heat and dielectric currents. The disadvantage of this method of assembling storage batteries, however, is that after a period of service the wooden frame becomes rotten in spite of the impregnation. This decay or rotting of the wood may be caused by moisture, traces of electrolyte, or the attack of various animal parasites such as termites or certain tropical insects.

In view of the foregoing it is the primary object of the present invention to provide a storage battery in which a plurality of storage cells are detachably mounted in a container at spaced intervals to provide insulating air gaps between adjacent cells.

Another object of the present invention is to provide a storage battery in which a plurality of storage cells are mounted in such manner that they are supported within a container but spaced from the bottom thereof.

Briefly stated the objects of the present invention are accomplished by providing a container adapted to have mounted therein in spaced relationship a plurality of storage cells. A pair of oppositely disposed walls of the container, such for example as the side walls, are provided with a plurality of spaced parallel ribs on the inner surfaces of these walls. These ribs are arranged in columns spaced at equal intervals, the ribs on one wall registering with like ribs on the other wall. These ribs are adapted to have received therebetween detachable supports. The storage cells are suspended from these supports in such manner that the storage cells are spaced from the bottom of the container.

These and further objects of the invention will be more clearly understood from the following description and accompanying drawings wherein like components in the several views are identified by the same reference numerals.

In the drawings:

Figure 1 is a perspective view of the container of the present invention, a portion of one of the walls being broken away to illustrate the interior thereof.

Figure 2 is a perspective view of the container of the present invention with a storage cell mounted therein, a portion of one of the walls of the container being broken away to illustrate the interior of the container and the method for mounting the storage cells therein.

Figure 3 is a perspective view illustrating in detail a support member adapted to support a storage cell in the container.

Figure 4 is an exploded perspective view illustrating in detail the securing strips for retaining the storage cells in position in the container of the present invention.

Figure 5 is an exploded perspective view illustrating a modified manner of mounting the storage cells in the container of the present invention, and Figure 6 is a perspective view of another embodiment of the container of the present invention.

Referring now to the drawings and particularly to Figures 1 through 4, the storage battery of the present invention includes a plurality or bank of storage cells 1 mounted in a container designated in general by the numeral 2. The storage cells 10 may be of any desired size and shape but as illustrated are generally rectangular in cross section and are encased in metal shells externally coated with a protective layer of insulating material.

The container 2 is an elongated rectangular body open at the top and formed by two spaced parallel side walls 3 and 4 which are interconnected by spaced parallel end walls 5 and 6 and a bottom wall 7. The container 2 is preferably made of sheet metal of such thickness that the side walls 3 and 4 will yield or deform slightly when pressure is applied laterally thereto. The sheet metal is of such thickness however, that this deformation remains within moderate limits for a purpose to be presently described. If desired the container may be lined internally and externally with a layer of insulating material.

Formed integrally with or attached to the side walls 3 and 5 are a plurality of spaced parallel ribs 8 which are disposed in parallel relation to the end walls 5 and 6. Each column of ribs 8 may consist of one elongated rib or as illustrated a plurality of discontinuous ribs 8. The ribs 8 may be attached to the side walls 3 and 4 or formed integrally therewith as aligned projections or punched bosses. The ribs on the side walls 3 and 4 are in registration for a purpose to be presently described. The column of ribs 8 on the side walls 3 and 4 are preferably spaced at equal intervals, the spacing therebetween corresponding substantially to the thickness of the storage cells 1 to be housed within the container 2, or to the width of the storage cell supporting members presently to be described.

Each storage cell 1 has attached or formed integrally with its end walls 14 and 15 a plurality of knobs or plugs 16. These plugs 16, as will presently be described, are adapted to support the storage cells 1 in the container 2. The number and size of the plugs 16 on each end wall 14 and 15 of the storage cell 1 may be varied in storage batteries of different sizes. In order to prevent the storage cell 1 from jolting or pivoting in the container 2 it is desirable that at least two plugs 16 be provided on each of the end walls 14 and 15 of the storage cells 1.

Each storage cell 1 is supported in the container 2 by engagement between the end walls 14 and 15 of the storage cell 1 with support plates or stilts 17 which are slidably mounted between adjacent ribs 8. The stilts 17 are either metal pressings which are coated with an insulating material or synthetic material adapted to resist the corrosive action of electrolyte. One side of each stilt 17 has a smooth finish in order to permit the stilt to be slidably inserted between adjacent ribs 8 and in engagement with the inner face of the side walls 3 and 4 of the container 2.

The height of these stilts 17 is such that when they are positioned in the container 2 between adjacent ribs 8 the bottom of the stilt 17 bears against the bottom wall 7, while the top of the stilt is preferably flush with the upper edge of the side walls 3 and 4. The outer face of each stilt 17 has attached thereto or formed integrally therewith cavitiese or sockets 18 corresponding in number and size with the plugs 16 on each of the end walls 14 and 15 of the storage cell 1. The spacing and arrangement of the sockets 18 on each stilt 17 is such that when the plugs 16 on the storage cells 1 are engaged by the sockets 18 the bottom of the storage cell 1 is spaced from the bottom wall 7 of the container 2.

The upper edge of each of the side walls 3 and 4 has removably associated therewith metal anchor strips 19 and 20 which are adapted to maintain the storage cells 1 and their associated stilts 17 in position within the container 2 by preventing removal or movement of the stilts 17. Each of the metal anchor strips 19 and 20 has a projecting lip portion 21 which extends inwardly within the container 2 when the anchor strips are in position along the longitudinal upper edges of the side walls 3 and 4. The lips 21 are adapted to overlap and bear against the upper edges of the stilts 17 and the upper edges of the end walls 5 and 6.

The opposite ends of each of the anchor strips 19 and 20 have attached thereto or formed integrally therewith lugs 23 and 24 which are transverse extensions of the lips 21. These lugs 23 and 24 are adapted to engage the top edges 11 and 12 of the end walls 5 and 6 and to be secured thereto, such for example as by screws 25 and 26.

In assembling the storage battery of the present invention a support plate is positioned on each of the end walls 14 and 15 of the storage cells 1 with the plugs 16 on the storage cells 1 engaging the sockets 18 in the stilts 17. The assembly consisting of a storage cell 1 and two stilts 17 is then inserted in the container 2 in the space available between adjacent ribs 8. The width of the container 2, that is the distance between the side walls 3 and 4, is preferably less than the length of the storage cell 1 plus the thickness of the stilts 17. In this manner when the assembly consisting of a storage cell 1 and the two stilts 17 associated therewith are slidably inserted in the container 2 a lateral pressure is exerted on the side walls 3 and 4 which causes them to flex slightly in an outward direction. It can therefore be seen that the storage cell assembly is force fitted into the container 2 which assists in maintaining the assembly in position within the container 2.

When all the storage cell assemblies have been inserted in the container 2 the anchor strips 19 and 20 are secured in position with the lip portions 21 thereof extending within the container 2 in engagement with the upper edges of the stilts 17. The anchor strips 19 and 20 are then secured to the end walls 5 and 6 to thereby lock the storage cells 1 in position within the container 2.

In order to facilitate handling of the storage battery of the present invention the end walls 5 and 6 of the container are provided with handle forming apertures 9 and 10. If desired the top edges 11 and 12 of the end walls 5 and 6 may be bent inwardly to extend within the container 2 to thereby provide channels to receive the lugs 23 and 24 of the anchor strips 19 and 20. The bottom wall 7 of container 2 is also preferably provided with a plurality of openings or perforations 13 in order to facilitate removal from the container 2 of any electrolyte that overflows during filling of the storage cells 1.

In the modification illustrated in Figure 5, the ribs 8 are continuous rather than intermittent such as in the embodiment illustrated in Figures 1 through 4. The width of the ribs 8 determines the spacing and therefore the air gap between adjacent storage cells 1 in the container 2 and may of course be varied to suit specific needs and installations.

The container 2 illustrated in Figure 6 is similar to those illustrated in Figures 1 and 2 with the exception that braces 27 are provided within the container 2 extending transversely between the side walls 3 and 4. These braces 27 are desirable in storage batteries having side walls 3 and 4 of great length in order to impart rigidity to the container 2. These braces 27 are also desirable when the storage battery of the present invention has relatively large end walls 5 and 6 in order to aid in guiding the storage cells 1 during their insertion in the container 2. The braces 27 may be secured to the ribs 8 such for example as by welding or riveting and the number of braces may be varied depending upon the size of the storage battery and the rigidity desired. The braces 27 are preferably made from stainless, rust proof or corrosion resistant material. They may also of course be made of metal covered with a suitable coating, or of pure synthetic material.

What has been described is a storage battery in which a plurality of storage cells are suspended in a container with a fixed spacing therebetween to insure proper ventilation. With the storage battery of the present invention dielectric currents resulting from electrolyte leaks are avoided and the use of wooden separators or other perishable members are eliminated.

It is to be understood that many variations and modifications may be made in the various embodiments of the present invention illustrated and described without departing from the scope of the present invention except as limited by the appended claims.

I claim:

1. A storage battery comprising a generally rectangular container having side walls, end walls and a perforate bottom wall, said container being dimensioned to accommodate therein a bank of rectangular storage cells in spaced parallel alignment with said end walls, the side walls of said container having ribs formed therein at spaced positions to define spaced-apart guideways for receiving the respective cells in said bank, the spacing between adjacent guideways being greater than the width of the cell received in each so as to maintain the cells in spaced parallel relation within the container relative to said end walls, the ribs on each side wall being in registration with ribs on the opposite side wall, the opposing ends of each cell having a plurality of plugs extending therefrom, elongated stilt members slidably receivable within said guideways and having a height substantially the same as said side walls, said stilt members having formed in one side thereof a plurality of sockets engageable with the plugs on the ends of said cells whereby said stilt members are attachable to opposing ends of said cells and slidably receivable within said guideways with said cells supported therebetween, said sockets and plugs being positioned at an elevation relative to said bottom wall so that said cells are supported in said container with air gaps between each other and at elevated positions therein relative to said bottom wall, and elongated anchor strips attachable to the tops of said side walls and extending the length thereof for retaining said cells in said container after insertion therein.

2. A storage battery comprising a generally rectangular container having side walls, end walls and a perforate bottom wall, said container being dimensioned to accommodate therein a bank of rectangular storage cells in spaced parallel alignment with said end walls, the side walls of said container having ribs formed therein at spaced positions to define spaced-apart guideways for receiving the respective cells, the spacing between adjacent guideways being greater than the width of a cell in each so as to maintain the cells in spaced parallel relation within the container relative to said end walls, the ribs on each side wall being in registration with ribs on the opposite side wall, the opposing ends of each cell having a plurality of plugs extending therefrom, elongated stilt members slidably receivable within said guideways and having a height substantially the same as said side walls, said stilt members having formed in one side thereof a plurality of sockets engageable with the plugs on the ends of said cell whereby said stilt members are attachable to opposing ends of said cells and slidably receivable within said guideways with said cells supported therebetween, said sockets and plugs being positioned at an elevation relative to said bottom wall so that said cells are supported in said container with air gaps between each other and at elevated positions therein relative to said bottom wall, elongated anchor strips attachable to the tops of said side walls and extending the length thereof, and lips extending from said anchor strips within said container for engagement with the tops of said stilt members to retain said cells in said container after insertion therein.

3. A storage battery comprising a generally rectangular container having side walls, end walls and a perforate bottom wall, said container being dimensioned to accommodate therein a bank of rectangular storage cells in spaced parallel alignment with said end walls, the side walls of said container having ribs formed therein at spaced positions to define spaced-apart guideways for receiving the respective cells in said bank, the spacing between adjacent guideways being greater than the width of the cell received in each so as to maintain the cells in spaced parallel relation within the container relative to said end walls, the ribs on each side wall being in registration with ribs on the opposite side wall, the opposing ends of each cell having a plurality of plugs extending therefrom, elongated stilt members slidably receivable within said guideways and having a height substantially the same as said side walls, said stilt members having formed in one side thereof a plurality of sockets engageable with the plugs on the ends of said cell whereby said stilt members are attachable to opposing ends of said cells and slidably receivable within said guideways with said cells supported therebetween, said sockets and plugs being positioned at an elevation relative to said bottom wall so that said cells are supported in said container with air gaps between each other and at elevated positions therein relative to said bottom wall, elongated anchor strips attachable to the tops of said side walls and extending the length thereof, lips extending from said anchor strips within said container for engagement with the tops of said stilt members to retain said cells in said container after insertion therein, and a brace extending between the tops of said side walls.

4. A storage battery comprising a generally rectangular container having side walls, end walls and a perforate bottom wall, said container being dimensioned to accommodate therein a bank of rectangular storage cells in spaced parallel alignment with said end walls, the side walls of said container having ribs formed therein at spaced positions to define spaced-apart guideways for receiving the respective cells in said bank, the spacing between adjacent guideways being greater than the width of the cell received in each so as to maintain the cells in spaced parallel relation within the container relative to said end walls, the ribs on each side wall being in registration with ribs on the opposite side wall, the opposing ends of each cell having a plurality of plugs extending therefrom, elongated stilt members slidably receivable within said guideways and having a height substantially the same as said side walls, said stilt members having formed in one side thereof a plurality of sockets engageable with the plugs on the ends of said cell whereby said stilt members are attachable to opposing ends of said cells and slidably receivable within said guideways with said cells supported therebetween, said sockets and plugs being positioned at an elevation relative to said bottom wall so that said cells are supported in said container with air gaps between each other and at elevated positions therein relative to said bottom wall, elongated anchor strips attachable to the tops of said side walls and extending the length thereof, lips extending from said anchor strips within said container for engagement with the tops of said stilt members to retain said cells in said container after insertion therein, and braces extending between the tops of said side walls parallel to said end walls, said braces being attached to ribs in registration on said side walls and adapted to guide said cells during insertion in said container between adjacent ribs.

References Cited in the file of this patent

UNITED STATES PATENTS

| 1,304,588 | Monahan | May 27, 1919 |
| 1,486,434 | Holden | Mar. 11, 1924 |
| 1,978,779 | Barton | Oct. 30, 1934 |
| 2,027,262 | Allen | Jan. 7, 1936 |

FOREIGN PATENTS

| 753,328 | France | Oct. 13, 1933 |
| 36,381 | Sweden | Jan. 16, 1913 |